United States Patent
Weinberger et al.

[11] Patent Number: 5,436,989
[45] Date of Patent: Jul. 25, 1995

[54] OPTICAL FIBER COUPLING

[75] Inventors: Imanuel Weinberger, Haifa; Ehud Dekel, Nofit, both of Israel

[73] Assignee: State of Israel, Ministry of Defence, Armament Development Authority, Haifa, Israel

[21] Appl. No.: 65,189

[22] Filed: May 20, 1993

[30] Foreign Application Priority Data

Jun. 3, 1992 [IL] Israel ..................... 102089

[51] Int. Cl.$^6$ ..................... G02B 6/00; G02B 6/36
[52] U.S. Cl. ..................... 385/33; 385/25; 385/42
[58] Field of Search ..................... 385/31, 32, 33, 34, 385/42, 25, 26

[56] References Cited

U.S. PATENT DOCUMENTS

| | | |
|---|---|---|
| 3,649,098 | 3/1972 | Suverison ..................... 385/33 |
| 4,165,913 | 8/1979 | Fitch ..................... 385/26 |
| 4,189,206 | 2/1980 | Terai et al. ..................... 385/25 X |
| 4,398,791 | 8/1983 | Dorsey ..................... 385/26 |
| 4,569,569 | 2/1986 | Stewart ..................... 385/25 X |
| 4,587,812 | 5/1986 | Brega ..................... 385/26 X |
| 4,649,271 | 3/1987 | Hök et al. ..................... 385/33 X |
| 4,705,351 | 11/1987 | Toda ..................... 385/33 X |
| 4,807,954 | 2/1989 | Oyamada et al. ..................... 385/33 X |
| 4,842,355 | 6/1989 | Gold et al. ..................... 385/26 |
| 4,929,045 | 5/1990 | Fuller ..................... 385/33 |
| 5,031,992 | 7/1991 | Corcoran ..................... 385/25 |
| 5,131,745 | 7/1992 | Whitney et al. ..................... 385/25 X |

*Primary Examiner*—Akm E. Ullah
*Attorney, Agent, or Firm*—Reising, Ethington, Barnard, Perry & Milton

[57] ABSTRACT

A coupling between optical fibers, one of which rotates respective a light sensor coupled to another such fiber. The light emanating from the end of the fiber facing the sensor reaches such sensor directly or it is focused onto it by a lens. The area of the sensor is larger than the fiber diameter, which is axially mounted in the rotating body, so as to cancel out misalignments resulting from high speed rotations of the fiber respective the sensor.

7 Claims, 1 Drawing Sheet

OPTICAL FIBER COUPLING

FIELD OF THE INVENTION

There is provided a contact-less coupling for the alignment of the light paths of light-conduits, such as optical fibers. The novel couplings are of simple and inexpensive nature, and have a wide field of application. They are of special value for the coupling of optical fibers, where one of the fibers rotates respective the other at any reasonable speed of rotation, even very high ones. A specific use is the coupling of optical fibers mounted on rotating platforms.

BACKGROUND OF THE INVENTION

There exist coupling devices of optical fibers, where these rotate one respective the other. These are either unidirectional or bidirectional couplings of rather complicated structure, and they are generally based on highly accurate and expensive ball bearings or the like. There exists a natural limit as regards the possible rotational speeds, and they are highly sensitive to any deviation from the highly exact axial alignment of the fibers, a very limiting fact in view of the requirement for highly precise axial alignment for coupling of optical fiber cores. These difficulties are especially pronounced when high speeds of rotation exist, which require an exact balancing of forces, prevention of any deviations, etc, and even more so when Single Mode fibers having very small cores are involved.

SUMMARY OF THE INVENTION

The invention relates to a contact-less optical coupling of light-guide fibers which are located at the axis of a rotating body which rotates at high speeds respective another such body.

The coupling between the rotating member with the optical fiber terminating at one of its ends, and another member which has also an axial fiber comprises a sensitive photoelectric element onto which the light coming from the fiber in the opposite member is projected, and this photoelectric element conducts the light to the fiber connected therewith. The surface of the sensor is large compared with the light beam coming from the optical fiber, which terminates in close proximity of the sensor. Thus the sensitivity to any deviation from the axial alignment is cancelled out, and this reduces the constraints existing with conventional couplings. The alignment of the optical fiber with the axis of the rotating body is attained using a ferule of a conventional optical connector of the FC or ST type. Opposing the exit of the optical fiber there is positioned a sensitive photoelectric element of adequate surface area. Advantageously a lens or lens system is positioned between fiber end and sensor, so as to focus the emanating light beam onto a small area of the sensor. These components have to be shielded against interfering stray light from other sources. The novel coupling can be used at high speeds of rotation, and experiments have shown that it functions without problems at rates of rotation of the order of tens of thousand revolutions per minute.

DESCRIPTION OF THE PREFERRED EMBODIMENT

The invention is illustrated with reference to the enclosed drawings, which are of a schematical nature and which are not according to scale, and in which.

Figure 1:
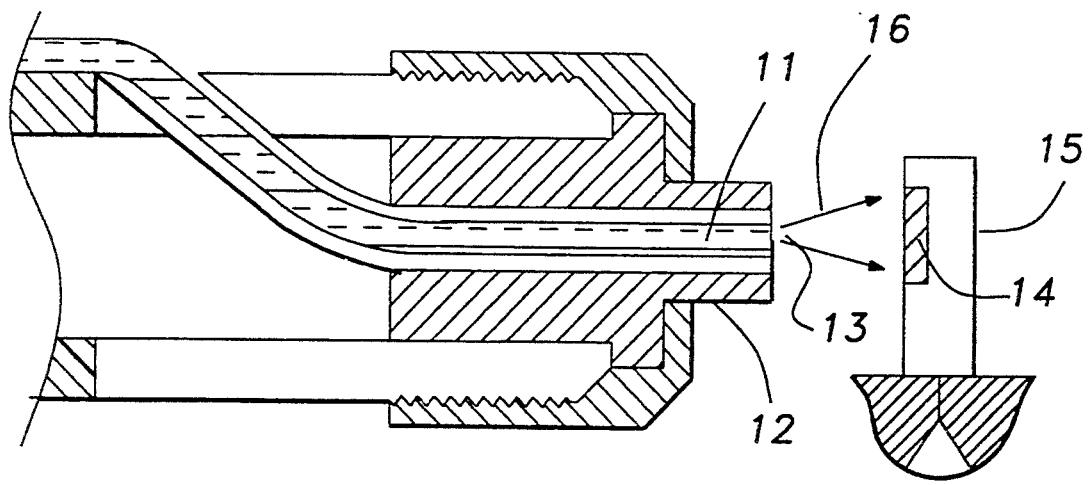
FIG. 1 is a side-view of a contactless coupling with end of fiber facing a photosensitive element.

As shown in FIG. 1, an optional fiber 11 is centered along the axis of the rotating member 12, with the end 13 of the fiber allowed to protrude from the end of the member 12, there being located opposite said end of the fiber, a photosensor 14, which is attached to stationary member 15, the light beam emanating from the fiber 16, spreading out to a certain extent.

Figure 2:
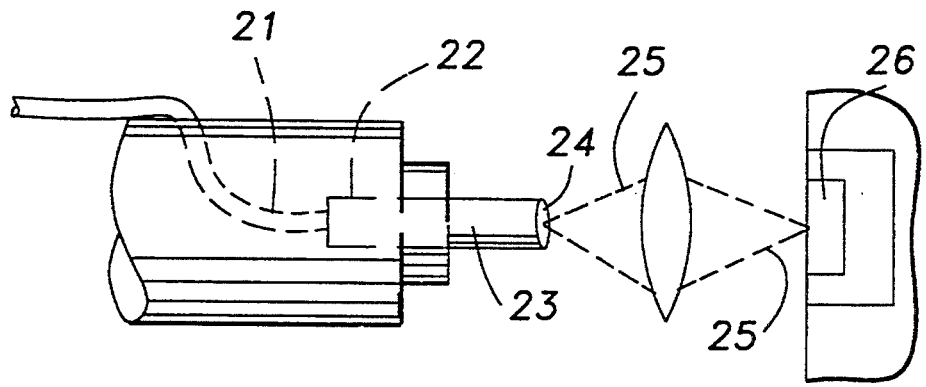
FIG. 2 is a side-view of a similar device, but with an optical lens between the fiber end and the sensor.

As shown in FIG. 2, the optical fiber 21, is aligned with the axis of rotatory member 22, with the end 23 of the fiber 21 allowed to protrude beyond the edge 24 of the said member 22. The light beam emanating from fiber 21 is focused by means of lens 25 onto the photosensor 26. With this arrangement, the light beam is focused onto a small area, so that even a deviation of the rotating member respective the sensor will not result in any loss of light, as the focused beam will still reach the surface of the sensor, which is much larger than the area of the focused beam.

A model was constructed with single mode fiber (SMF-28 of Corning Glass Works Inc), and a PIN type sensor (ETX 2000 T5) of Epitaxx Company was used. The optical fiber was held inside a zirconia tube of the type used in optical couplings. The zirconia tube was held in an axial position by mechanical means. The effective diameter of the InGaAs sensor was bout 2 mm, and its outer diameter 8.3 mm. It is desirable to use a sensor of at least about 2 mm diameter due to the axial deviations of the rotating member at high velocities. The type of sensur must be adjusted to the wavelength of the light beam conveyed by the optical fiber. It is of course possible to use such contact-less couplings also for multi-mode fibers. Good results were obtained with a Type 80-6103-1826-5 ceramic tubelet produced by 3M Company, used with an ST coupling. The fiber can be centered with an adhesive, or a tubelet with a vise can be used. Generally the distance from the end of the fiber to the sensor will be about 5 to 10 mm, but this is not critical. A preferred use for the coupling means of the invention is with communication channels, where data are transmitted via a physical channel, and where there exists the problem of passage between a light-conduit, such as optical fiber, which is part of a rotating platform, and between a static component of the channel. The novel coupling overcomes to a large extent the shortcomings of conventional rotary joints which are generally restricted to rather low rotational speeds, volume, restricted period of use due to wear-out. Due to the small diameter of optical fibers, the alignment of these is especially problematic and difficult.

The diameter of optical fibers is generally of the order of about 0.1 to about 0.5 mm, and when a fiber rotates at high velocities of rotating aligned at the exit with the axis of such device, its alignment respective a stationary opposite fiber is highly problematic. According to this invention the area of the photosensor located opposite the end of the rotating fiber, and mounted on a stationary part of the device, is much larger than the cross-section of the fiber, and thus the light emanating from the fiber will always reach the sensor, even if the axial alignment of the fiber in the rotating body is not perfect, and even if there exists a certain small angle between the axis of the part carrying the fiber and the surface of the sensor.

As the invention provides a contact-less coupling, very high speeds of rotation are possible without any mechanical problems. Light signals pass freely from the fiber opposite the sensor to such sensor, and from the same to another fiber coupled to the sensor attached to another optical fiber on the stationary part. The coupling can be used for monitoring the signals transmitted by an optical fiber while the fiber is unwound at great speeds from a bobbin.

We claim:

1. A contact-less optical coupling between light fibers, one of said light fibers rotates with a rotating body to be a rotating fiber, where an end of the rotating fiber is mounted axially in the end section of the rotating body and faces a light sensor of sensitive area many times larger than the diameter of said rotating fiber so that light emanating from the rotating fiber reaches said light sensor.

2. A coupling according to claim 1, where a lens is provided between the end of the rotating fiber and the light sensor, which lens focuses the light beam from the end of the rotating fiber onto a small part of the area of the sensor.

3. A coupling according to claim 1, where the rotating fiber is a single mode fiber or a multi-mode fiber.

4. A coupling according to claim 1, where the rotating fiber is centered at the axis of the rotating member by means of a ceramic tubelet.

5. A coupling according to claim 4, where the rotating fiber is centered in a tubelet provided with a vise.

6. A method for the contact-less optical coupling of a rotating fiber with a rotating body, and protruding from the end section thereof, with a stationary body, which comprises the steps of:

rotating said fiber along its longitudinal axis thereof in promixity to its end with said rotating body, and directing the light beam emanating from the end of the rotating optical fiber at the center of the rotating body onto a light sensor of much larger area than the cross section of said rotating fiber.

7. A method according to claim 6, where the rotating fiber protrudes beyond the end of the rotating body, and thus is close to the photosensor.

* * * * *